United States Patent
Costello (10) Patent No.: US 9,792,692 B2
(45) Date of Patent: Oct. 17, 2017

(54) DEPTH-BASED IMAGE ELEMENT REMOVAL

(71) Applicant: NCR Corporation, Duluth, GA (US)

(72) Inventor: Christopher John Costello, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 76 days.

(21) Appl. No.: 14/725,486

(22) Filed: May 29, 2015

(65) Prior Publication Data
US 2016/0350931 A1    Dec. 1, 2016

(51) Int. Cl.
| | |
|---|---|
| *G06K 9/00* | (2006.01) |
| *G06T 7/00* | (2017.01) |
| *G06K 9/34* | (2006.01) |
| *G06K 9/44* | (2006.01) |
| *G06K 9/46* | (2006.01) |
| *G06K 9/62* | (2006.01) |
| *G06Q 20/20* | (2012.01) |
| *G06T 7/11* | (2017.01) |
| *G06T 7/13* | (2017.01) |
| *G06T 7/194* | (2017.01) |

(52) U.S. Cl.
CPC ........ *G06T 7/0081* (2013.01); *G06K 9/00375* (2013.01); *G06K 9/34* (2013.01); *G06K 9/44* (2013.01); *G06K 9/4652* (2013.01); *G06K 9/6202* (2013.01); *G06Q 20/208* (2013.01); *G06T 7/11* (2017.01); *G06T 7/13* (2017.01); *G06T 7/194* (2017.01); *G06T 2200/04* (2013.01); *G06T 2207/10028* (2013.01); *G06T 2207/20044* (2013.01)

(58) Field of Classification Search
CPC ................ G06T 7/0081; G06T 7/0085; G06T 2207/10028; G06T 2207/20044; G06T 2207/20144; G06T 2200/04; G06K 9/4652; G06K 9/6202; G06Q 20/208
See application file for complete search history.

(56) References Cited

U.S. PATENT DOCUMENTS

| | | | |
|---|---|---|---|
| 6,236,736 B1 | 5/2001 | Crabtree et al. | |
| 7,448,542 B1 * | 11/2008 | Bobbitt | G06Q 20/208 186/61 |
| 8,295,546 B2 | 10/2012 | Craig et al. | |
| 8,342,401 B2 | 1/2013 | Hasegawa | |
| 8,837,780 B2 | 9/2014 | Jia et al. | |
| 9,275,277 B2 | 3/2016 | Onen et al. | |
| 2007/0217690 A1 * | 9/2007 | Dempski | G06K 9/00369 382/228 |
| 2010/0034457 A1 * | 2/2010 | Berliner | G06K 9/00362 382/154 |

(Continued)

*Primary Examiner* — Chan Park
*Assistant Examiner* — Elisa Rice
(74) *Attorney, Agent, or Firm* — Schwegman, Lundberg & Woessner (57) ABSTRACT

Various embodiments herein each include at least one of systems, methods, and software to enable depth-based image element removal. Some embodiments may be implemented in a store checkout context, while other embodiments may be implemented in other contexts such as at price-checking kiosks or devices that may be deployed within a store or other retail establishment, a library at a checkout terminal, and the like. Some embodiments include removing elements of images based at least in part on depth data.

20 Claims, 4 Drawing Sheets

(56) References Cited

U.S. PATENT DOCUMENTS

2013/0138534 A1\* 5/2013 Herwig .............. G06Q 30/0623
                                                          705/26.62
2015/0004627 A1   1/2015 Wu et al.
2015/0086126 A1\* 3/2015 Senzaki ................. G06T 5/002
                                                          382/263

\* cited by examiner

DEPTH-BASED IMAGE ELEMENT REMOVAL

BACKGROUND INFORMATION

Scanners, commonly referred to as product scanners and barcode scanners, at checkout terminals in recent years have begun transitioning from laser-based scanners to image, or camera, based scanners. Segmenting a product presented for scanning from a captured image has become an issue as an image-based scanner captures an image of a full field of view. Some image-processing techniques have been tried, but due to wide varieties of product and packaging colors and varying other things and items that may be present within a camera field of view, these image-processing techniques are prone to error.

SUMMARY

Various embodiments herein each include at least one of systems, methods, and software to enable depth-based image element removal. Some embodiments may be implemented in a store checkout context, while other embodiments may be implemented in other contexts such as at price-checking kiosks or devices that may be deployed within a store or other retail establishment, a library at a checkout terminal, and the like.

One method embodiment includes receiving image data including at least one image and depth data captured with regard to an imaging area of a scanner. Each of the at least one images may be captured by a distinct camera within a scanner and the depth data may be captured by a depth sensing device, such as a three-dimensional (3D) camera. In some embodiments, one of the scanner cameras may be a 3D camera that provides the depth data, while in other embodiment, a 3D camera or other depth sensing device may be deployed elsewhere that is directed to a same scanning field as the scanner. The method proceeds with regard to each image by removing pixels from the image for which pixel depth data of corresponding pixels is not included in the depth data and by identifying and removing matching shapes between a skeletal representation of the image and at least one shape wire-frame model. Once each of the images has been processed, which may include one or more images, the method then provides each of the at least one images to another process for further processing, such as barcode reading, fraud detection processing, and the like. In some embodiments, this example method may be performed by a computer connected to the scanner, such as a computer of a self-service terminal (SST) or Point-Of-Sale (POS) terminal, by computing resources present within the scanner, by a cloud or network based service, and the like.

DETAILED DESCRIPTION

Various embodiments herein each include at least one of systems, methods, and software to enable depth-based image element removal. Some embodiments may be implemented in a store checkout context, while other embodiments may be implemented in other contexts such as at price-checking kiosks or devices that may be deployed within a store or other retail establishment, a library at a checkout terminal, and the like As mentioned above, scanners at checkout terminals in recent years have begun transitioning from laser-based scanners to image, or camera, based scanners. Segmenting an item, such as a product, document, and the like, presented for scanning from a captured image has become an issue as an image-based scanner captures an image of a full field of view. Some image-processing techniques have been tried, but due to wide varieties of product and packaging colors and varying other things and items that may be present within a camera field of view, these image-processing techniques are prone to error.

Some embodiments herein aim to avoid errors of previous embodiments and to enable new functionality, such as with regard to fraud detection at checkout terminals such as human-assisted POS terminals and self-checkout terminals. Some such embodiments add depth-sensing capabilities to a scan field of a scanner, such as the NCR REALSCAN™ 79 bi-optic imager scanner/scale available from NCR Corporation of Duluth, Ga. The depth-sensing capabilities may be provided in various embodiments with a depth-sensing device. The depth-sensing device may be a camera of a scanner or another device integrated within a scanner or connected to the scanner or a POS terminal, but positioned proximately or otherwise in relation thereto. The depth-sensing device is typically positioned to have a view including the scanner scan field. The depth-sensing device may be a depth-sensing camera, ultra-sonic device, or other device capable of sensing depth. The output of the depth-sensing device is typically a matrix of depth measurements, which may be considered and referred to similarly to pixels of an image from a scanner camera. The depth sensor and each camera of the scanner, which may include one, two, or more cameras, are calibrated with one another such that pixels of a camera-captured image can be aligned or correlated to depth-measured pixels from the depth-sensing device. In some embodiments, depth-measured pixels from the depth-sensing device may be captured at a different resolution than that of one or more of the cameras of the scanner. This may be accounted for in image processing of various embodiments by down sampling captured images, accounting for one depth-measured pixel from the depth-sensing device as providing a depth measurement for a plurality of image pixels, and the like.

In some embodiments, the depth data may be utilized to assist in identifying and isolating an item presented for scanning, noise within captured images such as arms, hands, and fingers, and other items that may want to be kept in or removed from one or more images.

In one example embodiment, one or more images may be captured along with depth data when an item is presented within a scan field of a scanner. Each camera may be calibrated or configured with a known background. The known background of each image may first be removed, such as by zeroing or blacking out image pixels that match either exactly or probabilistically with the known background. Next, in some embodiments, image pixels are removed that have correlated depth data pixels with no value, or other value, indicating no depth data is available.

At this point, the pixel data remaining in each of the one or more images likely includes only the item presented for scanning and arms, hands, and fingers of the person presenting the item. Some embodiments may then perform edge detection on each of the images to obtain image copies in memory including outlines of each item remaining in the images. A topological skeleton transform may then be applied to the image copies in memory and one or both of two-dimensional (2D) and 3D wireframe shape models, such as wireframe shape models of arms, hands, and fingers, may be applied to identify matches thereto. This matching When matches are identified, pixels of the corresponding images are removed. In some embodiments, colors of these removed pixels are considered before their removal to obtain an actual or estimated color or greyscale value of skin tone. Then, after these pixels are removed, the images may be further process in some embodiments to identify other pixels that are likely skin of arms, hands, and fingers, as may be actually or probabilistically matched, such as by applying a Bayesian method for match confidence, and these pixels may also be removed.

Through such image segmentation processing, images captured by cameras of a scanner can be accurately segmented to remove most, if not all, irrelevant pixels. This allows isolation of an item presented for scanning for more accurate processing, such as to read one or more product barcodes, image comparison to known product images to confirm the presented product matches the product of a read barcode, image recognition, and other processing for many purposes such as fraud detection.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
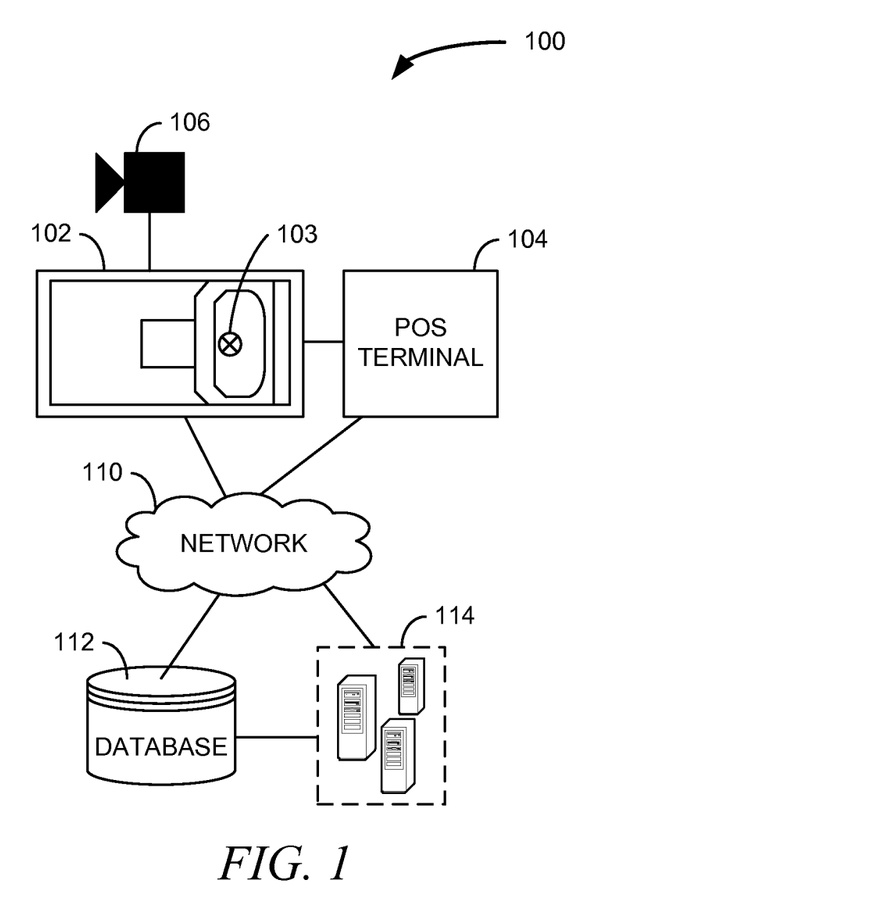
FIG. 1 is a logical block diagram of a system, according to an example embodiment.

FIG. 1 is a logical block diagram of a system 100, according to an example embodiment. The system 100 is an example of deployment in a retail environment, although the various embodiments herein are also applicable to other environments, such as customer service kiosks and library checkouts, travel check-in kiosks, among others.

The system 100 includes a scanner 102 coupled to a terminal 104. The scanner 102 may be a product scanner, barcode scanner, or similar scanning device in some embodiments. An example of such a scanner is the NCR REALSCAN™ 79 bi-optic imager scanner/scale available from NCR Corporation of Duluth, Ga. Such modern scanners utilize one or more cameras in performing their scanning functions. As such, these cameras may be utilized to capture images of presented items, such as products, documents, and the like.

The terminal 104 may be a modern cash register serviced by a checkout clerk or cashier, or it may be a self-checkout terminal or other Self-Service Terminal (SST), customer service kiosk, and the like. The scanner 102 may include a depth-sensing device 106 therein, affixed thereto, such as at point 103, or otherwise positioned to have a view of a scan field of the scanner 102. The depth-sensing device 106 may be coupled to the scanner 102, the terminal 104, both the scanner 102 and the terminal 106, or to neither. In some embodiments, the depth-sensing device 106 may be coupled to a network 110 to communicate data to one or more of the scanner 102, the terminal 106, a database 112, and one or more processes that execute on a server 114. Thus, the scanner 102, terminal 104, database 112, and server 114 may also be connected, via either wired or wireless connections to exchange data there between and with the depth-sensing device 106.

In operation, the depth-sensing device 106 captures depth data in a synchronized manner with the one or more cameras of the scanner 102. Depth data from the depth-sensing device 106 and image(s) from the one or more scanner 102 cameras are then subjected to segmentation processing. The segmentation processing, in various embodiments, may be performed on the scanner 102, the terminal 104, or on the server 114. Regardless of where the segmentation processing occurs, the depth data and the images are received thereon from both the scanner 102 cameras and the depth-sensing device 106. The segmentation processing may be performed for various purposes, such as to remove image elements that are not relevant for a particular purpose or to isolate certain elements within images for the same or different particular purpose. The particular purpose may differ between embodiments, but may include barcode reading, comparison of an image with one or more known images of a product identified by a read barcode, product shape matching, and other purposes. Some such purposes may be specifically related to barcode reading, fraud detection, and the like.

In some embodiments, the images from the scanner 102 cameras and the depth data from the depth-sensing device 106 may be stored in the database 112 along with post-segmentation processing data for later review, processing, quality control, and the like.

Figure 2:
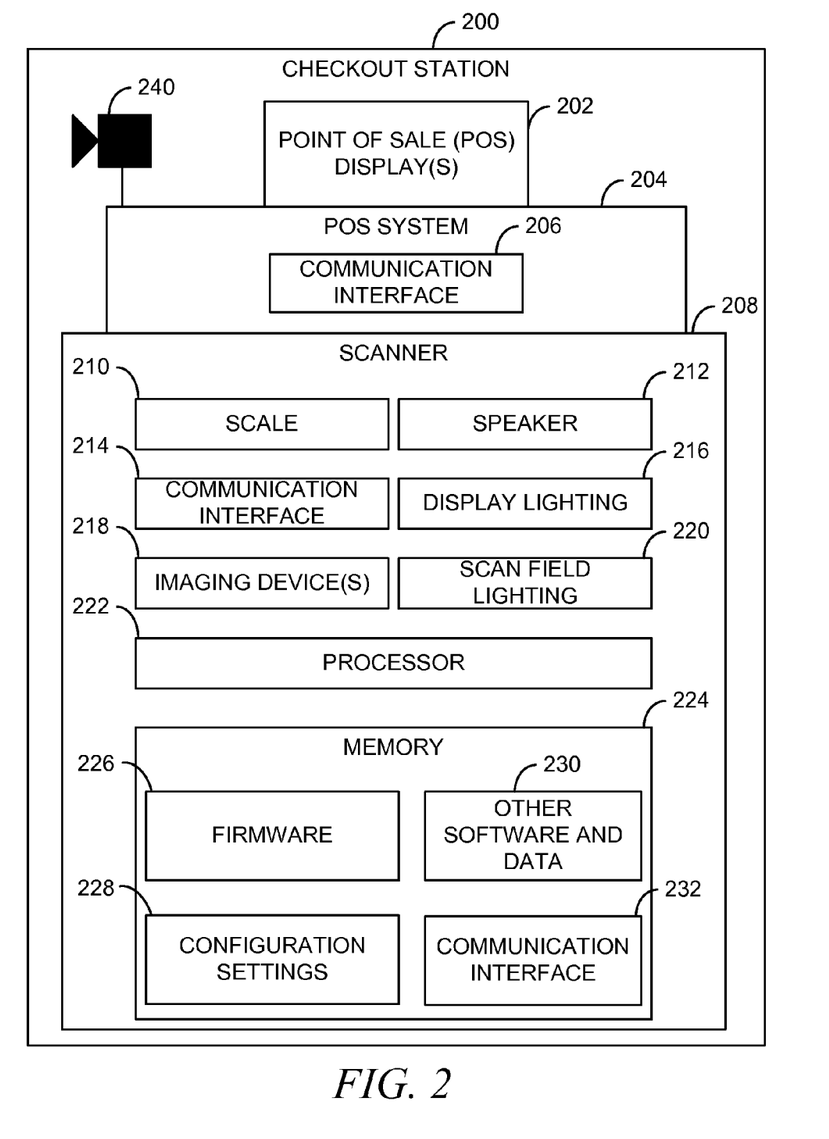
FIG. 2 is a diagram illustrating components of a checkout station, according to an example embodiment.

FIG. 2 is a diagram illustrating components of a checkout station 200, according to an example embodiment. It is to be noted that the checkout station 200 is shown schematically in greatly simplified form, with example components relevant to understanding various embodiments herein. The same situation may be true for the other various components of the checkout station 200. Note that the checkout station 200 may include more or fewer components in some embodiments.

Furthermore, the various components included in the FIG. 2 as illustrated and arranged are provided for illustration purposes only. It is to be noted that other arrangements with more or fewer components are possible without departing from the contributions herein, in particular with regard to automatic and remote scanner configuration.

Moreover, the methods and scanner presented herein and below may include all or some combination of the components shown in the context of the checkout station 200. Further, although a checkout station 200 is illustrated as including a scanner 208, the scanner 208 may be a stand-alone element or an element of other systems, devices, and terminals in other embodiment. Examples of other terminal-types that may include a scanner 208 are self-service terminals (SSTs), clerk operated and self-service library checkout stations, time-keeping terminals, and the like.

The methods of some embodiments are programmed as executable instructions in memory and/or non-transitory computer-readable storage media and executed on one or more processors associated with the components and devices herein. Some such components may be firmware.

The checkout station 200 includes one or more POS displays 202 that present information of a POS system 204 coupled to the one or more POS displays 202. Information presented by the one or more POS displays 202 includes information relevant in a retail context and with regard to operation of the checkout station. The checkout station 200 also includes the scanner 208. The POS system 204 is generally a computer, such as a computer in the form of the computing device illustrated and described below with regard to FIG. 4. The POS system includes at least one communication interface 206, which may be utilized to communicate with the scanner 208, over a network, and with other device, such as a depth-sensing device 240.

The scanner 208 may be referred to herein as a product scanner or barcode scanner as that is the task most commonly associated with such devices. During operation, items are placed within a scan field of the scanner 208. One or more imaging devices 218 of the scanner 208, such as one or more cameras, then scan a barcode and information read therefrom may be communicated to a POS system. The POS system may then use that data to identify the item placed within the scan field of the scanner 208 and performs an additional function. The additional function may include a price lookup and addition of the item to a list of items to be purchased, which may be presented on the one or more POS displays. The additional function may also include identifying a scanned product as a controlled item for which an age, identity, and/or address validation must be performed. A message may be presented on the one or more POS displays and a message may also be sent to the scanner 208 indicating an identification card or other document is to be scanned.

In some embodiments, the scanner 208 may also receive depth data from a depth-sensing device 240 that captures depth data with regard to one or more scan fields of the scanner 208. In other embodiments, depth data may be received by the POS system 204 from the depth-sensing device 240. Regardless of whether the POS system 204 or the scanner 208 receives the depth data, in some embodiments, depth data captured by the depth-sensing device 240 is captured synchronously or near synchronously with images captured by the one or more imaging devices 218 of the scanner 208. As the depth data and the images are captured synchronously or near synchronously, pixels of the images may be correlated to pixels of the depth data.

The scanner 208 may include one or more scan fields, such as two scan fields of bi-optic scanners that are commonly seen in grocery and discount retail outlets. In addition to the imaging devices 218, the scanner 208 may include various other components. The various other components may include an integrated scale 210 such as may be used in a grocery outlet to weigh produce and one or both of a speaker 212 and display lighting 216 to output audio a visual signals such as signals of (un)successful scans. The scanner 208 may also include scan field lighting 220 that may be turned on and off and adjusted based on a detected presence of an item to be scanned.

During typical operation, the scanner 208 is operated according to instructions executed on a processor 222. The processor 222 may be an application specific integrated circuit (ASIC), digital signal processor, microprocessor, or other type of processor. The instructions may be firmware 226 or software 230 stored in one or more memories 224. The one or more memories 224 may be or include volatile and non-volatile memories, write-protected memories, write-once memories, random access memory (RAM), read only memories (ROM), secure memory, and other memory and data storage types and devices.

The instructions as may be stored in firmware 226 or as software 230 in memory 224 are executed according configuration settings stored in the memory 224. Configuration settings 228 configure operation of the scanner 208 and the various components therein. For example, the configuration settings 208 may configure speaker 212 volume, display lighting 216 outputs, and scan field lighting 220 brightness. The configuration settings may also configure decoding algorithms of the imaging device(s) 218 and the instructions, one or more communication protocols used to communicate data from the scanner 208 to a POS system or other system via wired or wireless connections, and scale 210 operating parameters (e.g., unit of measure as pounds or kilograms). The configuration settings may also configure other settings of the particular scanner 208 an embodiment may include. In some embodiments, the configuration settings 228 may include a firmware version, a software version, image processing parameters, and the like. Thus, when a configuration is set or updated, the setting or updating of the configuration settings 228 may include population and updates of any of the configuration settings 228 of a particular embodiment, including an update to firmware and software present on the scanner.

The scanner 208 may include one or more communication interfaces 214, 232 that enable the scanner 208 to communicate via one or both of wired and wireless connections over a network and with other computing devices. In some embodiments, the communication interface 232 may provide a virtualized communication connection on the scanner 208 that enables the scanner to communicate over a network leveraging network connectivity of a terminal or other computing device with which the scanner is paired, such as a POS terminal.

During operation, the one or more imaging devices 218 of the scanner 208 capture images, such as still images and frames of video. These still images and video may be transmitted to or stored within the memory 224 or other data storage device of the scanner 208, the POS system 206, or transmitted via one of the communication interface 214, 232 over a network to another device, such as the server 114 of FIG. 1. Synchronously therewith, the depth-sensing device 240 may capture depth data and provide that data to one or more of these same locations. The image data and the depth data may then be processed together to segment the images according to one or more of the methods described herein, such as the method 300 of FIG. 3.

Figure 3:
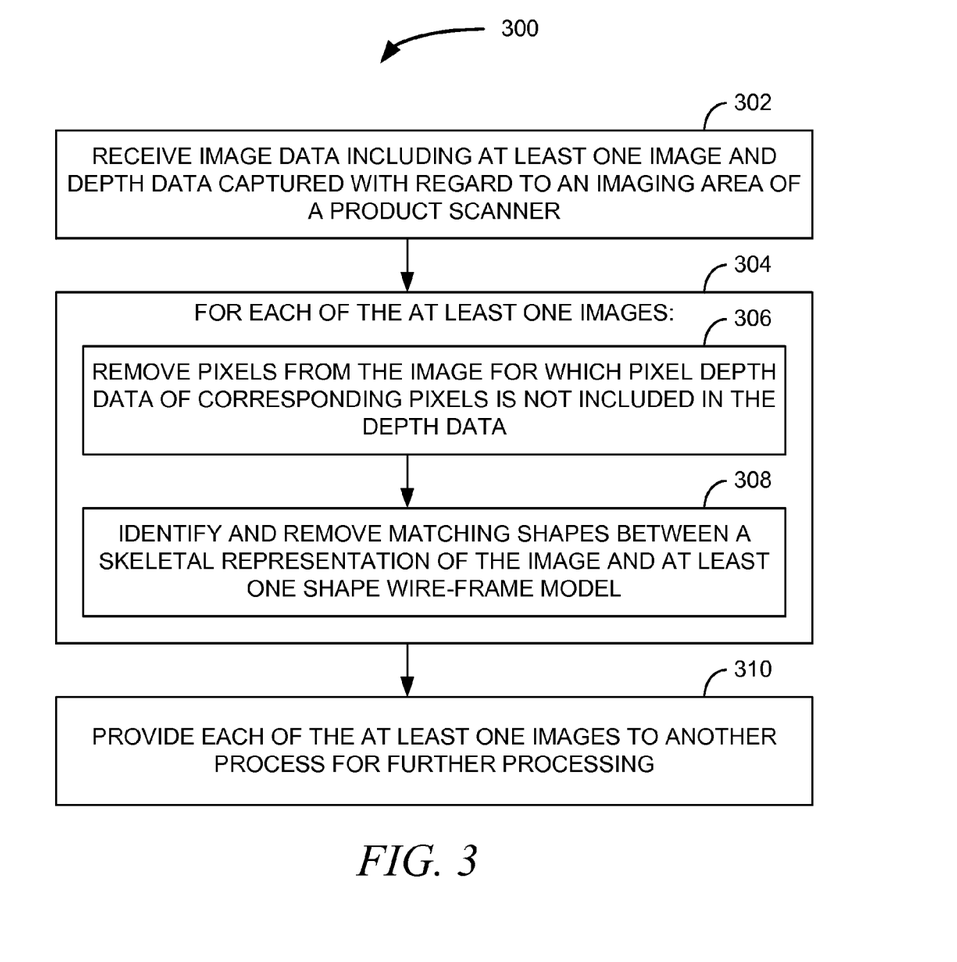
FIG. 3 is a block flow diagram of a method, according to an example embodiment.

FIG. 3 is a block flow diagram of a method 300, according to an example embodiment. The method 300 is an example of a method that may be performed by a POS system, a scanner, a server, or a web or network service to segment images for various purposes, such a barcode reading, fraud detection, document processing, and others.

The method 300 includes receiving 302 image data including at least one image and depth data captured with regard to an imaging area of a product scanner. The method 300 further, for each 304 of the at least one images includes removing 306 pixels from the image for which pixel depth data of corresponding pixels is not included in the depth data and identifying and removing 308 matching shapes between a skeletal representation of the image and at least one shape wire-frame model. The method 300 then provides 310 each of the at least one images to another process for further processing.

In some embodiments, the processing of each image 304 includes obtaining a skeletal representation of a respective image. Obtaining a skeletal representation may include performing edge detection on the image to identify dominant shapes in the image and applying a skeletal transform to the image and the edges detected therein to obtain the skeletal image. The at least one shape wire-frame model in some such embodiments includes shape wire-frame models of human arms, hands, and fingers. In some such embodiments, for each of the at least one images, the method 300 further includes identifying a skin color of at least one of an arm, hand, and finger identified by the wire-frame matching with regard to at least one of the images. In such embodiments, the method 300 may then remove pixels matching the identified skin color. The matching in some embodiments may be absolute matching based on pixel color or greyscale values, while in other embodiments, the matching of identified skin color is performed according to probabilistic matching algorithm.

In some further embodiments of the method 300, identified features within one image that are to be removed may be used to assist in identifying features in another image. For example, a scanner may include two or more cameras that each obtain an image that is processed to remove 306 pixels from the respective image. As the images from the cameras are oriented in relation to one another, such as five cameras within a scanner oriented to capture images of a bottom, front, left and right sides, and back of an item presented for scanning, features located within one image may inform the method 300 in identifying and locating features in other images. A simple example is the capture of a hand and fingers in images when an item is presented for scanning. A portion of a hand may be located in a bottom right area of the bottom image. However, not all fingers of that hand are located within the bottom image. This information may be utilized to focus a search in a bottom-right area of the right side image and a bottom-right area of the front image. Further, a count of fingers identified by the wire-frame model matching may be kept such that should all five fingers be located within the images, the processing may stop or continue until all fingers are located.

In some additional embodiments, sizes of fingers relative to one another may be utilized to determine which fingers have been identified to inform the process of which further finger or fingers to look for and where. For example, when a thumb if located to the left of a finger, it can be assumed the other fingers will be located to the right of the thumb. An assumption may also be made in the processing that the finger already located is an index finger and a first finger to the right of the index finger will be longer than the index finger. This information can be used to select wire-frame models and sizing to match to candidate skeletal representations. Further, most grips have relatively evenly spaced fingers. The distance of the spacing can also be used to inform the processes of where to look for a next finger, such as to the right of a certain approximate distance. The depth data may also be utilized along with the skeletal representations in locating fingers, hands, and arms as items presented for scanning typically will have uniform surfaces while fingers, hands, and arms will protrude outwardly from a presented item.

Each of these data points or inferences in such embodiments assist in efficient image processing in such embodiments. For example, a location of a finger in a first image in view of a known related orientation with a second or third image, the depth data, wire-model matching with known shapes, relative finger sizes, and likely spacing may be used to inform the method 300 as to high probability areas where to search within images for features to be removed. Likewise, lower probability areas can be avoided or consideration thereof performed only after the higher probability areas have not yielded a desired result. Further, lower probability areas may simply be skipped in some embodiments. As many items may be presented at a scanner within a transaction, speed of processing is important in many embodiments. Through such probabilistic inferences, speed of image processing may be increased to help ensure high productivity at terminals and the like.

In some of these and other embodiments of the method 300, the method 300 also includes removing from each of the at least one images, a respective background. Such a background is generally known based on one or more previously captured images from a respective camera.

Figure 4:
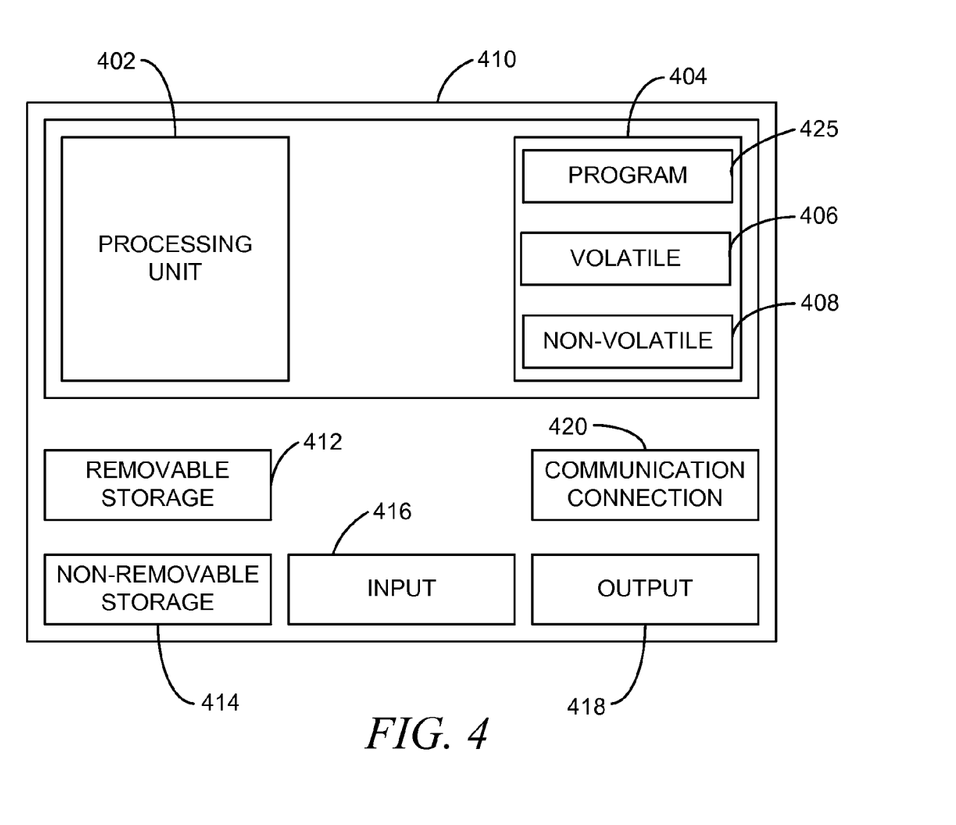
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4, as well as FIG. 1 and FIG. 2. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

Another system embodiment includes a system comprising at least one processor, at least one memory device, and an image data interface. This system further includes an instruction set accessible in the at least one memory device and executable by the at least one processor to perform data processing activities. In some embodiments, the data processing activities include receiving, via the image data interface, image data including at least one image and depth data captured with regard to an imaging area of a product scanner. The imaging interface may be a data communication device or interconnect device over which image and depth data may be received from one or more imaging devices such as cameras and at least one depth-sensing device.

The data processing activities of this system embodiment further include, for each of the at least one images, removing a calibrated background from the image and removing pixels from the image for which pixel depth data of corresponding pixels is not included in the depth data. The processing of each image further includes identifying and removing matching shapes between a skeletal representation of the image and at least one shape wire-frame model and providing each of the at least one images to another process for further processing.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving image data including at least one image and depth data captured with regard to an imaging area of a product scanner;
for each of the at least one images:
removing pixels from the image for which pixel depth data of corresponding pixels is not included in the depth data; and
identifying and removing matching shapes between a skeletal representation of the image and at least one shape wire-frame model; and
providing each of the at least one images to another process for further processing.

2. The method of claim 1, further comprising:
obtaining a skeletal representation of a respective image, the obtaining comprising:
performing edge detection on the image to identify dominant shapes in the image; and
applying a skeletal transform to the image and the edges detected therein to obtain the skeletal image.

3. The method of claim 1, wherein the at least one shape wire-frame model includes shape wire-frame models of human arms, hands, and fingers.

4. The method of claim 3, wherein for each of the at least one images, the method further comprising:
identifying skin color of at least one of an arm, hand, and finger identified by the wire-frame matching with regard to at least one of the images; and
removing pixels matching the identified skin color.

5. The method of claim 4, wherein matching the identified skin color is performed according to probabilistic matching algorithm.

6. The method of claim 1, further comprising:
removing from each of the at least one images, a respective background.

7. The method of claim 1, wherein the further processing includes a process that compares the image data to image data of a product identified via barcode scanning to determine whether the received image data represents a product of the product identified via the barcode scanning.

8. A method comprising:
receiving image data including at least one image and depth data captured with regard to an imaging area;
for each of the at least one images:
removing pixels from the image for which pixel depth data of corresponding pixels is not included in the depth data;
obtaining a skeletal image of the image;
perform wire-frame matching between the skeletal image and at least one shape wire-frame model to identify matching shapes within the respective image; and
removing pixels of matching shapes from respective images;
providing each of the at least one images to another process for further processing.

9. The method of claim 8, wherein obtaining a skeletal image of the image includes:
   performing edge detection on the image to identify dominant shapes in the image; and
   applying a skeletal transform to the image and the edges detected therein to obtain the skeletal image.

10. The method of claim 8, wherein the at least one shape wire-frame model includes shape wire-frame models of human arms, hands, and fingers.

11. The method of claim 10, wherein for each of the at least one images, the method further comprising:
   identifying skin color of at least one of an arm, hand, and finger identified by the wire-frame matching with regard to at least one of the images; and
   removing pixels matching the identified skin color.

12. The method of claim 11, wherein matching the identified skin color is performed according to probabilistic matching algorithm.

13. The method of claim 8, further comprising:
   removing from each of the at least one images, a respective background.

14. The method of claim 8, wherein the further processing includes a process that compares the image data to image data of a product identified via barcode scanning to determine whether the received image data represents a product of the product identified via the barcode scanning.

15. A system comprising:
   at least one processor, at least one memory device, and an image data interface;
   an instruction set accessible in the at least one memory device and executable by the at least one processor to perform data processing activities, the data processing activities comprising:
      receiving, via the image data interface, image data including at least one image and depth data captured with regard to an imaging area of a product scanner;
      for each of the at least one images:
         removing a calibrated background from the image;
         removing pixels from the image for which pixel depth data of corresponding pixels is not included in the depth data; and
         identifying and removing matching shapes between a skeletal representation of the image and at least one shape wire-frame model; and
      providing each of the at least one images to another process for further processing.

16. The system of claim 15, the data processing activities further comprising:
   obtaining a skeletal representation of a respective image, the obtaining comprising:
      performing edge detection on the image to identify dominant shapes in the image; and
      applying a skeletal transform to the image and the edges detected therein to obtain the skeletal image.

17. The system of claim 15, wherein the at least one shape wire-frame model includes shape wire-frame models of human arms, hands, and fingers.

18. The system of claim 3, wherein for each of the at least one images, the method further comprising:
   identifying skin color of at least one of an arm, hand, and finger identified by the wire-frame matching with regard to at least one of the images; and
   removing pixels matching the identified skin color.

19. The system of claim 18, wherein matching the identified skin color is performed according to probabilistic matching algorithm.

20. The system of claim 15, wherein the further processing includes a process that compares the image data to image data of a product identified via barcode scanning to determine whether the received image data represents a product of the product identified via the barcode scanning.

* * * * *